United States Patent
Schoofs et al.

(10) Patent No.: US 6,487,532 B1
(45) Date of Patent: Nov. 26, 2002

(54) APPARATUS AND METHOD FOR DISTINGUISHING SIMILAR-SOUNDING UTTERANCES SPEECH RECOGNITION

(75) Inventors: Koen Schoofs, Haasrode (BE); Guido Gallopyn, Zottegem (BE)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/159,838

(22) Filed: Sep. 24, 1998

Related U.S. Application Data

(60) Provisional application No. 60/059,895, filed on Sep. 24, 1997.

(51) Int. Cl.[7] .......................... G10L 15/00; G10L 15/22
(52) U.S. Cl. ........................... 704/251; 704/246
(58) Field of Search ................ 704/9, 235, 255–257, 704/270, 275, 270.1, 251, 252–254, 246–249

(56) References Cited

U.S. PATENT DOCUMENTS

| | | | |
|---|---|---|---|
| 5,054,074 A | 10/1991 | Bakis ........................... 381/41 |
| 5,058,167 A | * 10/1991 | Kimura ...................... 704/249 |
| 5,146,405 A | * 9/1992 | Church .......................... 704/9 |
| 5,752,230 A | * 5/1998 | Alonso-Cedo .............. 704/270 |
| 5,828,991 A | * 10/1998 | Skiena et al. .................. 704/9 |
| 5,903,864 A | * 5/1999 | Gadbois et al. ............. 704/251 |

FOREIGN PATENT DOCUMENTS

FR 2735268 12/1996

* cited by examiner

Primary Examiner—David D. Knepper
(74) Attorney, Agent, or Firm—Bromberg & Sunstein LLP

(57) ABSTRACT

Speaker-specified hints are used to establish conditions for a speech recognition system to select a recognition result for a previously provided utterance from among various possible homophones. The hints may characterize the utterance by a linguistic property, such as an orthographic, morphological, or semantic property.

25 Claims, 6 Drawing Sheets

APPARATUS AND METHOD FOR DISTINGUISHING SIMILAR-SOUNDING UTTERANCES SPEECH RECOGNITION

The present application claims priority from U.S. provisional patent application No. 60/059,895, filed Sep. 24, 1997 which is hereby incorporated herein by reference.

TECHNICAL FIELD

The present invention relates to speech recognition systems, and more particularly, to dictation systems.

BACKGROUND

One of the most difficult problems for speech recognition systems is how to choose the correct alternative from a list of words that are pronounced similarly or identically, but spelled differently. Such similar sounding words are known as homophones. For example, in English, "read, red" or "send, sent" are such homophones, as are the French words "parle, parles, parlent". Humans select the correct homophone by considering the context in which a given word appears, or by understanding the content of the text. This technique is, however, not yet feasible for computer systems.

In current computer-based speech recognition systems, one alternative is selected. If that alternative is incorrect, the user may then go and correct the selection, for example, by choosing another alternative from a list of similar-sounding words. This method has the disadvantage that the user must spot the mistake in the recognized text, and then correct it. This takes extra time, breaks the flow of dictation, and carries the risk that some errors may be overlooked.

SUMMARY OF THE INVENTION

In accordance with a preferred embodiment of the invention, a method is provided for utilizing a speech recognizer to distinguish a provided utterance from one or more similar-sounding utterances based on a speaker-specified hint. The method includes identifying a hint and associating it with the provided utterance, using the hint to establish a condition for distinguishing the provided utterance from the one or more similar-sounding utterances, and selecting a recognition result that satisfies the condition. The recognition result is derived in conjunction with the operation of the speech recognizer.

In accordance with further embodiments of the invention, selecting a recognition result includes providing a list of alternative recognition possibilities and filtering the list based upon the condition. The speech recognizer may be used to provide entries in the list of alternative recognition possibilities. Alternatively, or in addition, a dictionary may be used to provide entries in the list. The hint may be a linguistic property characterizing the provided utterance or, in the same or an alternative embodiment, the hint may make reference to the context of previous dictation to characterize the provided utterance. Where the hint is a linguistic property, it may be an orthographic, morphological, or semantic property of the provided utterance (As used in this description and in the following claims, the term "fractional spelling" means providing the spelling for a portion of the word, wherein the portion need not, but might possibly, include the beginning of the word, and does not include the whole word).

In accordance with a still further embodiment of the invention, the hint may provide some other desired criterion for selecting the provided utterance. The utterance may be a word, or alternatively, a phrase. For the purposes of this description and the following claims, a "hint" excludes a complete spelling of a word or phrase. The speech recognizer may also use a plurality of hints. In accordance with this embodiment, a method is provided for utilizing a speech recognizer to distinguish a provided utterance from one or more similar-sounding utterances. The method includes identifying a plurality of hints and associating them with the provided utterance, using the hints to establish conditions for distinguishing the provided utterance, and selecting a recognition result that satisfies the conditions. The recognition result is derived in conjunction with the operation of the speech recognizer.

In accordance with another aspect of the present invention, an improved speech recognition system is taught for distinguishing a provided utterance from one or more similar-sounding utterances when a speaker-identified hint is provided. The improved speech recognition system provides a text output in response to a spoken input. The system includes a hint recognizer for identifying the speaker-identified hint and associating it with the provided utterance. The system also includes a condition specifier, coupled to the hint recognizer, which uses the hint to establish a condition for distinguishing the provided utterance. The system further includes a result selector, coupled to the condition specifier, which selects a recognition result that satisfies the condition.

In accordance with a further embodiment of the invention, the result selector includes a filter operative on a list of alternative recognition possibilities. In a still further embodiment, the improved speech recognition system also includes a dictionary, coupled to the result selector, to provide entries in the list of alternative recognition possibilities. As previously mentioned, the hint may be a linguistic (e.g., orthographic, morphological, or semantic) property characterizing the provided utterance, or may make reference to the context of previous dictation to characterize the provided utterance, or may provide some other desired criterion for selecting the provided utterance.

In accordance with yet a further embodiment of the invention, a system is taught for utilizing a plurality of hints to distinguish a provided utterance from one or more similar-sounding utterances. The system includes a hint recognizer for identifying the hints and associating them with the provided utterance. The system also includes a condition specifier, coupled to the hint recognizer, for using the hints to establish conditions for distinguishing the provided utterance. The system further includes a result selector, coupled to the condition specifier, for selecting a recognition result that satisfies the conditions.

BRIEF DESCRIPTION OF THE DRAWINGS

The foregoing aspects of the invention will be more readily understood by reference to the following detailed description taken with the accompanying drawings in which.

DETAILED DESCRIPTION OF SPECIFIC EMBODIMENTS

Distinguishing spoken commands from dictated text is known in the art and described, for example, in U.S. Pat. No. 5,794,196, issued to Yegnanarayanan et al. As a preliminary matter, we provide and abridged version of the detailed description of that earlier patent.

Figure 1:
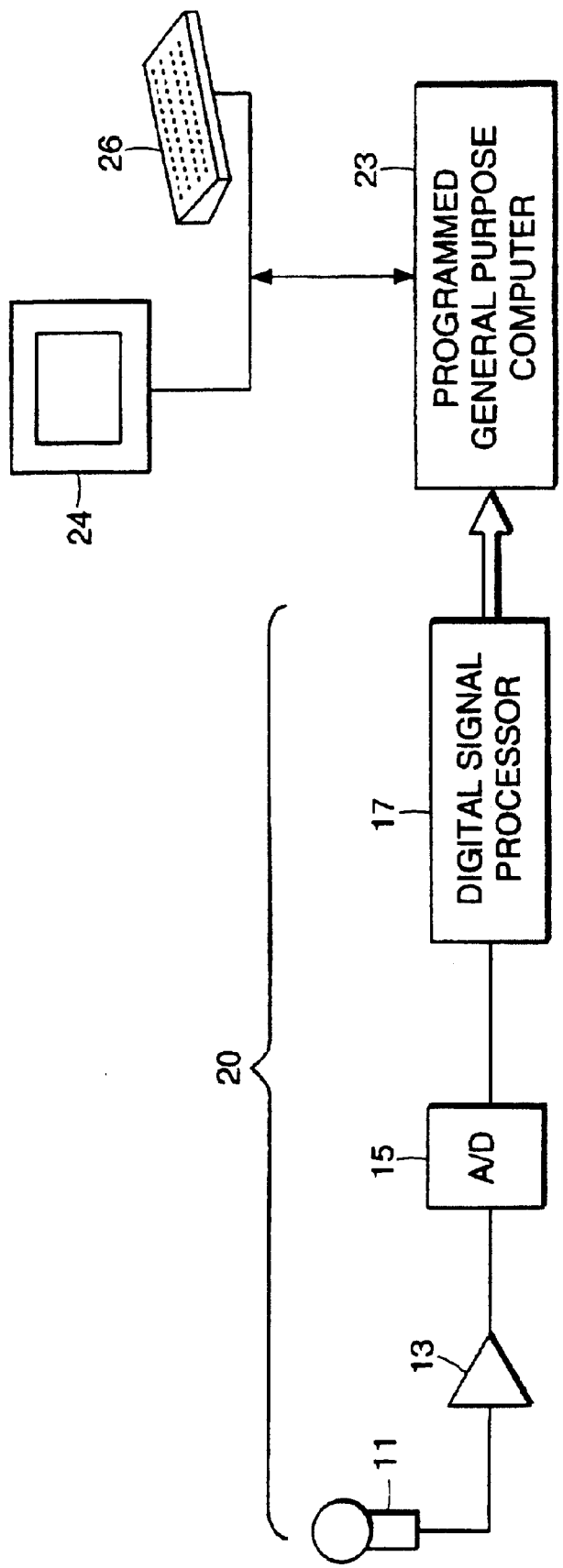
FIG. 1 is a block diagram of a speech recognition system in accordance with the prior art.

With reference to FIG. 1, the transducer indicated there is a microphone 11 which is connected, through a suitable pre-amplifier 13, to an analog-to-digital converter 15. The gain of pre-amplifier 13 is preferably adjustable under software control. The digitized speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame, which may be considered to be a multidimensional vector.

The raw spectral information obtained from the front end circuitry 20 is further preprocessed in the computer 23 to replace each sample or input frame with an index which corresponds to or identifies one of a predetermined set of standard or prototype spectral distributions or frames. In the particular embodiment being described, 1024 such standard frames are utilized. In the art, this substitution is conventionally referred to as vector quantization and the indices are commonly referred to as VQ indices. The preprocessing of the input data by the computer 23 also includes an estimating of the beginning and end of a word or continuous phrase in an unknown speech input segment, e.g. based on the energy level values. For this purpose, the input circuitry may incorporate a software adjustable control parameter, designated the "sensitivity" value, which sets a threshold distinguishing user speech from background noise.

Vocabulary models are represented by sequences of standard or prototype states, which are represented by indices. Rather than representing spectral distributions, the state indices identify or correspond to probability distribution functions. The state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state. The distance or likelihood values which fill the tables can be generated by statistical training methods. A preferred system for precalculating and storing a table of distance measurements is disclosed in U.S. Pat. No. 5,546,499. The disclosure of that application is incorporated herein by reference.

Natural variations in speaking rate require that some method be employed for time aligning a sequence of frames representing an unknown speech segment with each sequence of states representing a vocabulary word. This process is commonly referred to as time warping.

In isolated word recognition, the sequence of frames which constitute the unknown speech segment taken together with a sequence of states representing a vocabulary model in effect define a matrix and the time warping process involves finding a path across the matrix which produces the best score, e.g., least distance or cost. The distance or cost is typically arrived at by accumulating the cost or distance values associated with each pairing of frame index with state index as described previously with respect to the VQ (vector quantization) process. An isolated word speech recognition system will typically identify the best scoring model and may also identify a ranked list of possible alternates.

In addition to words which are to be recognized so as to generate an appropriate translation (spelling) as text input for a user's application program, the discrete word vocabulary may also include models of common intrusive noises, e.g. paper rustling, door closing, or a cough. When an acoustic input is best matched with one of these models, a NUL output or no output is provided to the user's application program.

In continuous speech recognition, states corresponding to phones or other sub-units of speech are typically interconnected in a form of network which is decoded in correspondence with the ongoing utterance. A score is then built up progressively as the utterance proceeds. The total score this is a function both of the degree of match of the utterance with the decoded path and the length of the utterance.

Figure 2:
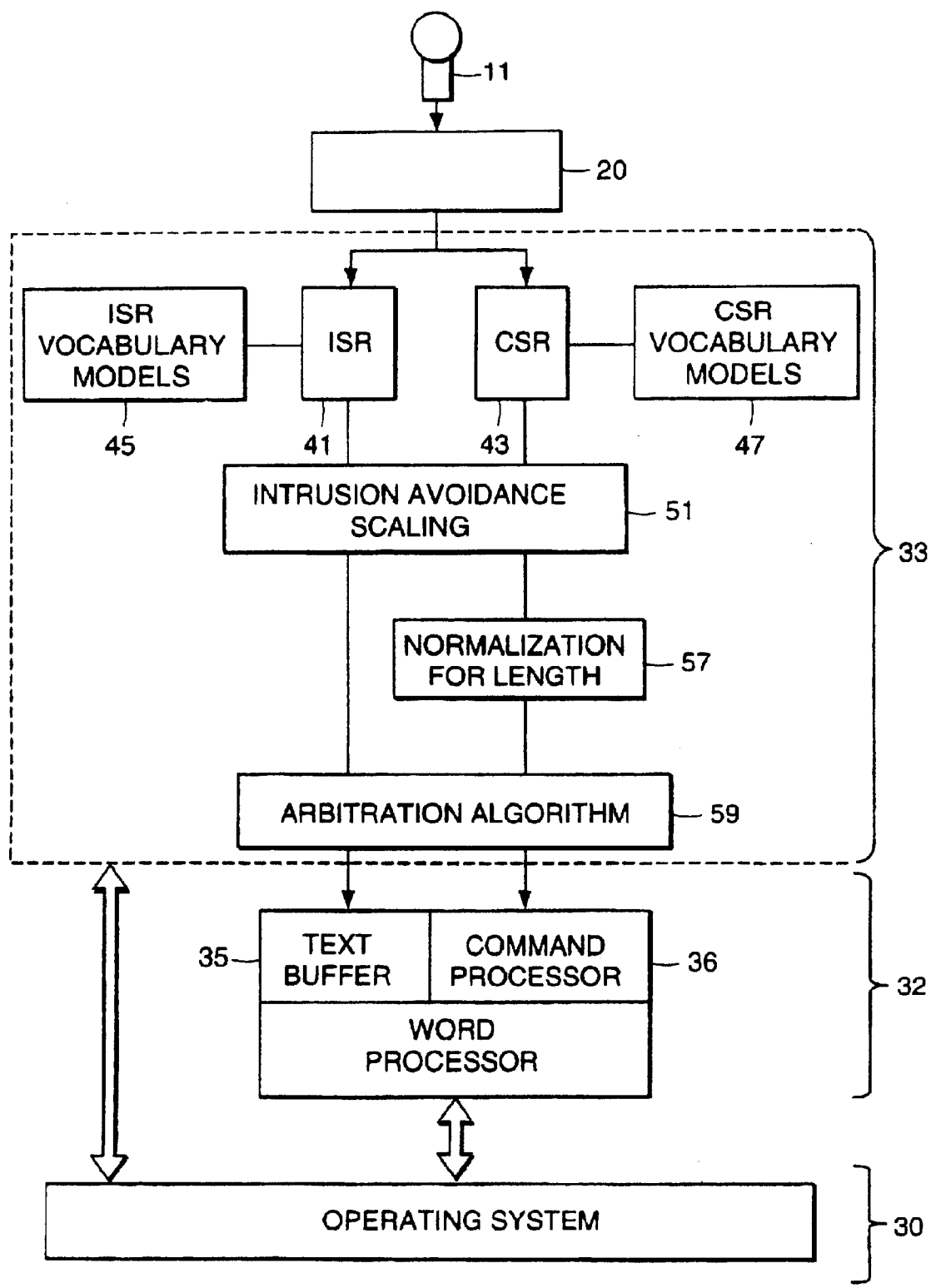
FIG. 2 is a diagram illustrating the relationship of various software components employed in the system of FIG. 1.

Referring now to FIG. 2, the software components illustrated there can be grouped into three subsystems, the operating system 30, an application program such as a word processor 32, and the compound speech recognizer 33 of the present invention. The operating system may, for example, be the Windows 95 operating system from Microsoft of Belleview, Wash. while the application program, for example, could be the Wordperfect word processing software from WordPerfect Corporation of Orem, Utah. As is understood, application programs such as word processors and spreadsheets expect that command input should be differentiated from text or data input. Further, commands are typically made up of a sequence of words. While discrete word recognizers can recognize simple or short phrase commands which match up with a single predetermined model, e.g. in the manner described in U.S. Pat. No. 5,231,670 (Goldhor), the flexibility of such systems is limited. In FIG. 2, the word processor's text buffer is indicated by reference character 35 while the command processor component is indicated by reference character 36.

The compound speech recognizer 33 illustrated in FIG. 2 includes both an isolated-word speech recognition (ISR) module 41 and a continuous speech recognition (CSR) module 43. An input utterance received by the microphone 11 and processed by the front end 20 is applied to both the ISR module 41 and the CSR module 33. While these modules are shown in FIG. 2 as though operating on the input in parallel, they may in fact occur sequentially, or performed on a time shared basis using the computational resources available. As noted previously, the continuous speech recognizer typically works by building up a hypothesis progressively and, thus, it can start working while the utterance is taking place. The isolated word speech recognizer on the other hand typically requires a complete set of input frames before it performs its comparison process.

The ISR module 41 employs a large vocabulary of appropriately defined text word models, this vocabulary being designated by reference character 45. A large vocabulary may be considered as one having in excess of 5000 models and typically in the order of 30,000 models. In contrast, the CSR module 43 employs a relatively small vocabulary of appropriately configured control word models, designated by reference character 47. In the context of the present invention, a small vocabulary may be considered to be one of fewer than 2000 models and typically in the order of 200 models. Some words may appear in both vocabularies, but they will be differently represented and incorrect interpretations should be logically excluded.

The two recognition modules 41 and 43 will employ different types of models and different scoring mechanisms so that the scores are not directly comparable. Relative scaling of the scores is applied as indicated at reference character 51 to minimize or avoid intrusions by each vocabulary on correct translations from the other vocabulary. A single scale factor could be applied to the results of either of the recognizer modules or respective factors could be applied to both. In the particular embodiment illustrated, a scaling factor is applied to the scores obtained from the CSR module 43 to render them basically comparable with the scores obtained from the ISR module 41. A procedure for training up this scaling factor is described in greater detail hereinafter with reference to FIG. 3.

Since the total score generated by the CSR will be affected by the length of the utterance (which may comprise multiple control words, digits or other vocabulary models), a normalization for length is applied as indicated at reference character 57. This normalization can also be incorporated within the arbitration algorithm as next described. An arbitration algorithm for selecting among the competing translation candidates is indicated at reference character 59. The operation of this algorithm is described in greater detail hereinafter with reference to FIG. 4.

Figure 3:
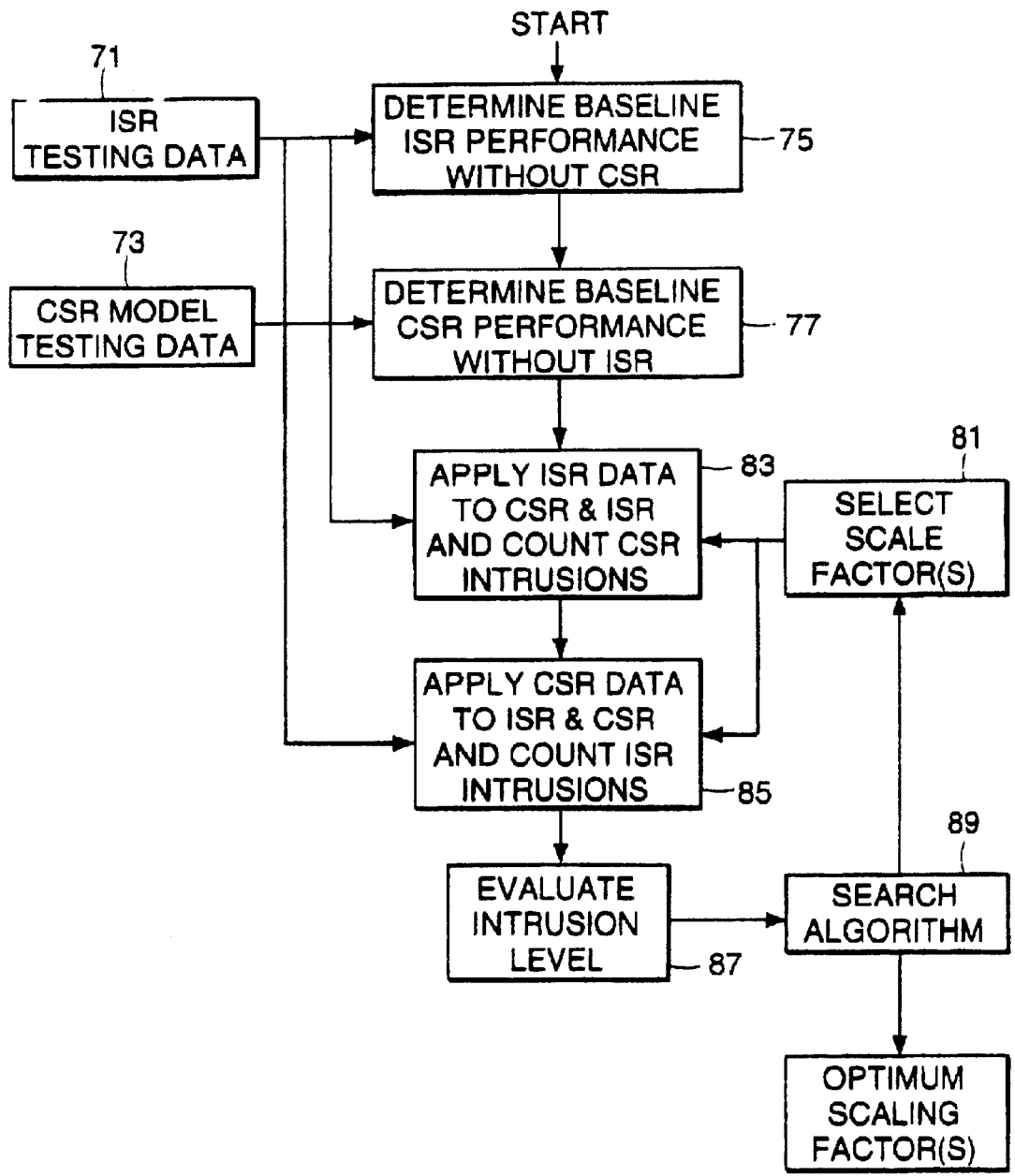
FIG. 3 is a flow chart illustrating the training of scaling values utilized in the system of FIGS. 1 and 2.

The ISR module and the CSR module employ models of different character. Further, each of these sets of models will typically have been trained using a respective source of training data, i.e., multiple samples of various users speaking the words to be recognized. Likewise, each set of models will typically be tested with a separate respective set of data. In FIG. 3, the ISR model testing data is indicated by reference character 71 and the CSR model testing data is indicated by reference character 73.

Baseline performance levels for the ISR and CSR modules is first determined independently for each module without interference by the other as indicated respectively at reference characters 75 and 77. For a given scale factor selected as indicated at reference character 79, the ISR testing data is then applied both to the CSR and the ISR modules, as indicated at reference character 83, and the intrusions by CSR models are counted. An intrusion is a case in which a CSR hypothesis has produced a score better than the score accorded to the correct translation by the ISR module. Similarly, the CSR testing data is applied to the ISR and CSR modules as indicated at reference character 85 and intrusions by ISR translations into correct CSR translations are counted.

The intrusion level is evaluated as indicated at reference character 87 and a search algorithm, designated by reference character 89, repeatedly adjusts the selected scale factor to minimize the intrusion level and to identify the optimum scaling factor which is then output and utilized in the step indicated by reference character 51 in FIG. 2. Any one of various search algorithms may be utilized, the simplest of which is to merely generate a series of scale factors and then pick the best performing one of them.

Figure 4:
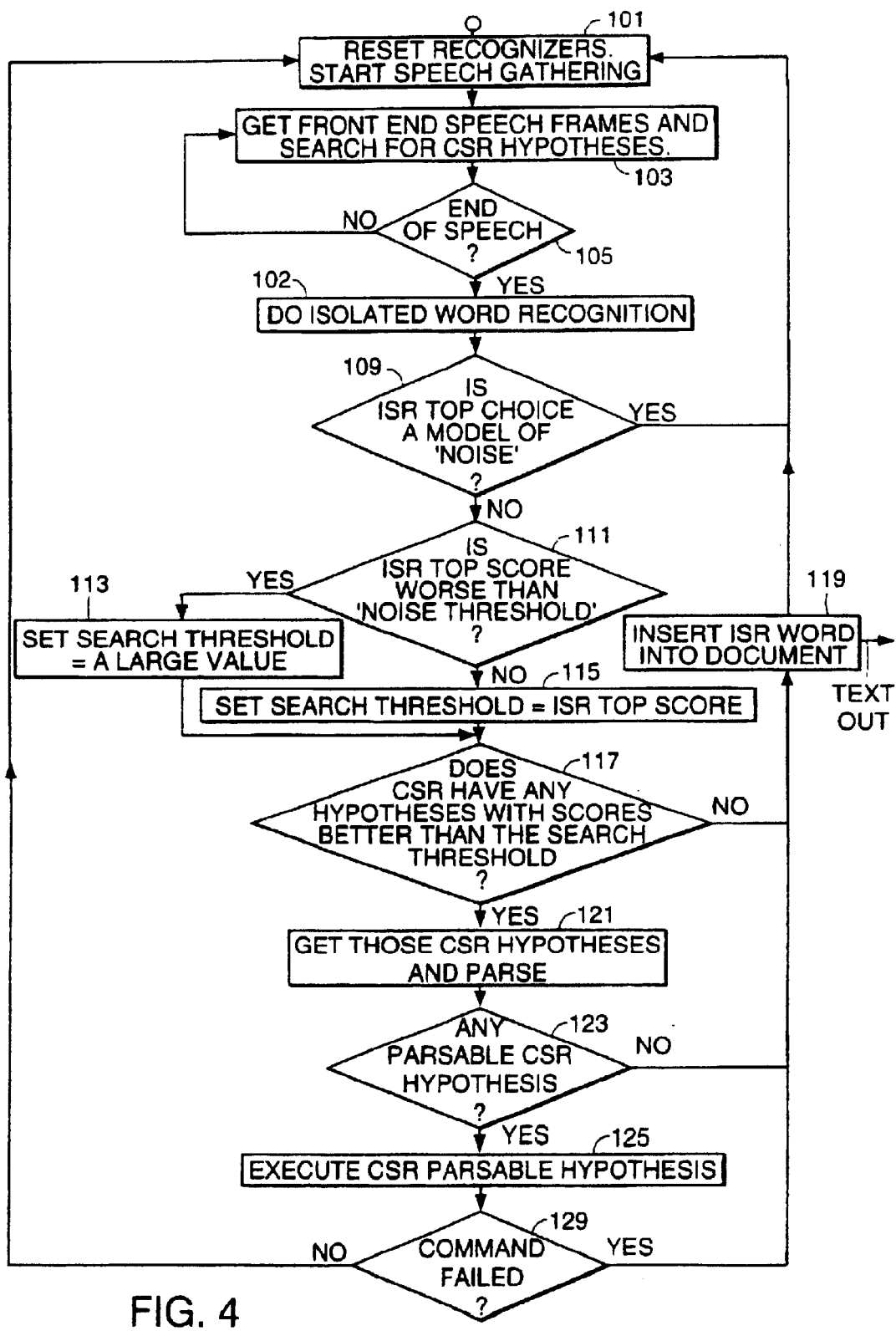
FIG. 4 is a flow chart illustrating the operation of the compound speech recognizer included in the system of FIG. 2.

The general operation of the arbitration algorithm 59 is to determine whether the user's utterance corresponds best with text input or command input and to select the appropriate or corresponding translation for outputting to the corresponding portion of the application program. With reference to FIG. 4, the procedure starts with both recognizers being reset and an utterance beginning so that the front end is generating a sequence of frames as described previously. This initial stage is indicated by reference character 101.

The continuous speech recognizer works progressively and thus can start developing hypotheses immediately. This operation is designated at reference character 103. The front end processing also determines the start and end of speech. Testing for the end of speech is indicated at reference character 105. So long as the end of speech is not detected, the CSR operation continues.

Once the end of speech is detected, isolated word recognition is performed as indicated at block 107. If the top choice out of the isolated word recognizer is a model which is associated with a predetermined noise, the system resets as indicated at block 109. A test is also performed, as indicated at block 111, to determine if the score of the best scoring model was better than an arbitrarily selected noise threshold. If there is a poor score, the CSR search threshold is set to a preselected large value as indicated at block 113. Otherwise, the CSR search threshold is set equal to the best score generated by the isolated word recognizer, this step being indicated at block 115.

If the CSR does not have any hypotheses with scores better than the search threshold, as tested at block 117, the word corresponding to the best scoring model recognized by the isolated word recognizer is output to the text buffer of the word processor, as indicated at block 119, and the compound recognizer is reset by returning to block 101.

In the embodiment illustrated, examples of properly parsable commands are as follows:

erase the previous word
align line to the left
center sentence
underline this
delete previous word
open file
capitalize this line
bold the first four words in the next paragraph
uppercase the next four words
move this paragraph to the end of the document
italicize the last three words in this sentence
bold this sentence
decrease font size of this line by two
bullet the next four paragraphs
go to the beginning of the previous paragraph
extend the selection by five more characters
delete this sentence If the CSR has hypotheses with scores better than the search threshold, those hypotheses are parsed, as indicated at block 121 to determine if the sequence of models equates with a reasonable command string. If none of the qualifying CSR hypotheses are parsable, as tested at block 123, the best scoring text word from the isolated word recognizer is output (119) and the compound recognizer again reset as indicated at block 101.

If any of the CSR qualifying hypotheses are parsable, the best scoring one is submitted to the command processor 36 of the application program as indicated at block 125. Even though a command string is properly parsable, it may not be executable by the application program if the current state of the application program does not admit of such command. In such a case, the application program will typically return an error code indicating that the command failed. If the command fails, as tested at block 129, the compound recognizer reverts to outputting the text word identified by the isolated word recognizer and resets. On the other hand, if the command succeeds, the process reverts to the starting point where the recognizers are reset as indicated at block 101.

With the scaling factor adjusted as described, a user can dictate, in an isolated or paused manner, text chosen from the large isolated word vocabulary 45 or, without changing modes or otherwise intervening in the ongoing operation of the system, can speak continuous speech commands selected from the smaller vocabulary 47 available to the continuous speech recognition module 43.

Having reviewed the material in U.S. Pat. No. 5,794,196, we now continue with a detailed description of the present invention. A representative embodiment provides a solution to the homophone problem by allowing the user to give hints about the correct spelling of a word. Such user-provided hints may be given in an intuitive manner, while the dictation is going on, without requiring that the word be spelled in its entirety. In the example of "send, sent" the hint may be that the user dictates: "sent with-a-t" or "send with-a-d". A preferred embodiment may also be used for Asian languages to give hints about which character (KANJI, for example) to select for a word. Such a preferred embodiment may be used in virtually any language, particularly in languages having many homophonic words such as French and Chinese.

Figure 5:
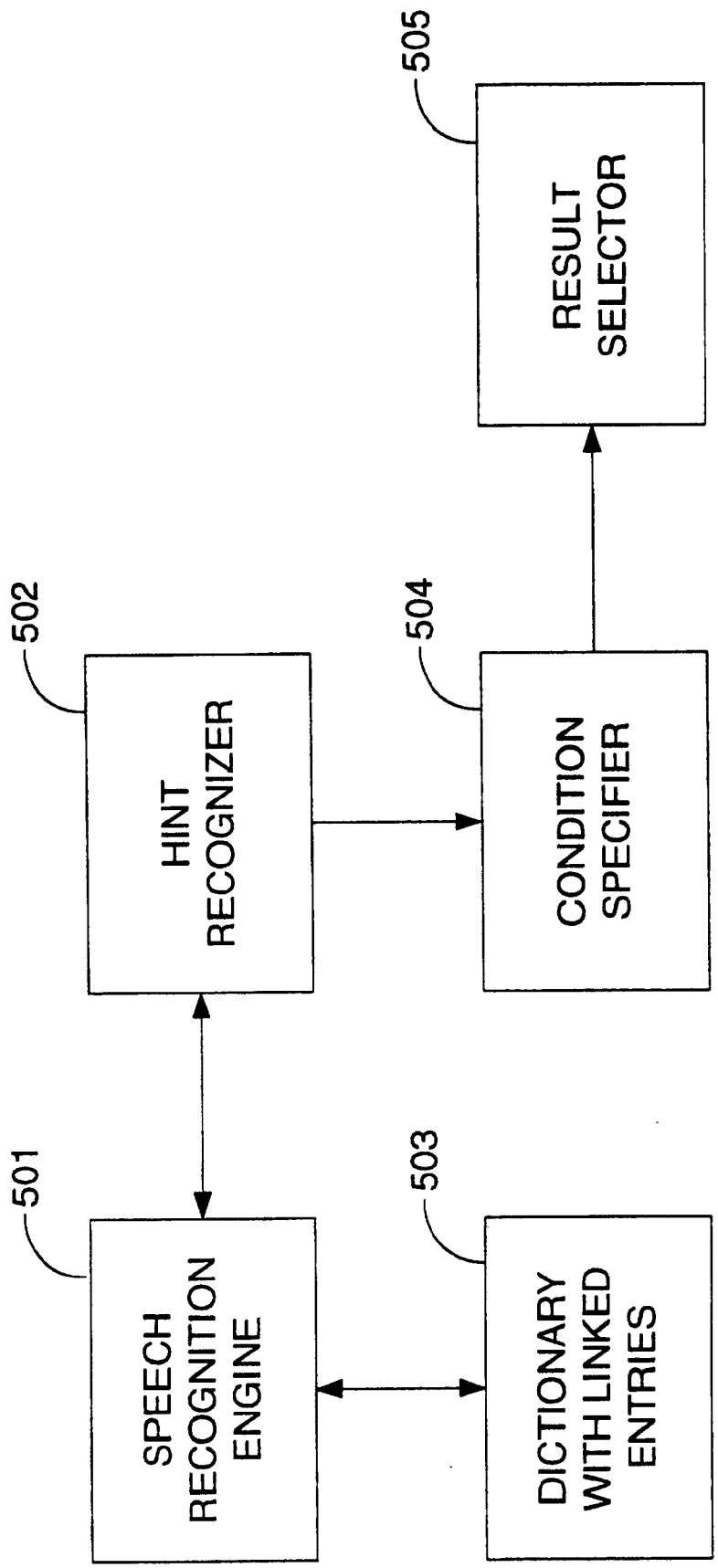
FIG. 5 is a block diagram of a system to which the present invention is applicable.

Thus, as shown in FIG. 5, a preferred embodiment includes a speech recognition engine 501 such as is well-known in the art. For example, the speech recognition engine 501 may be a large vocabulary continuous speech recognition engine such as that used in VoiceXpress™ manufactured by Lernout & Hauspie Speech Products N.V., located in Burlington, Mass. Further information on the design of a speech recognition system is provided, for example, in Rabiner and Juang, *Fundamentals of Speech Recognition,* Prentice Hall 1993.

Figure 6:
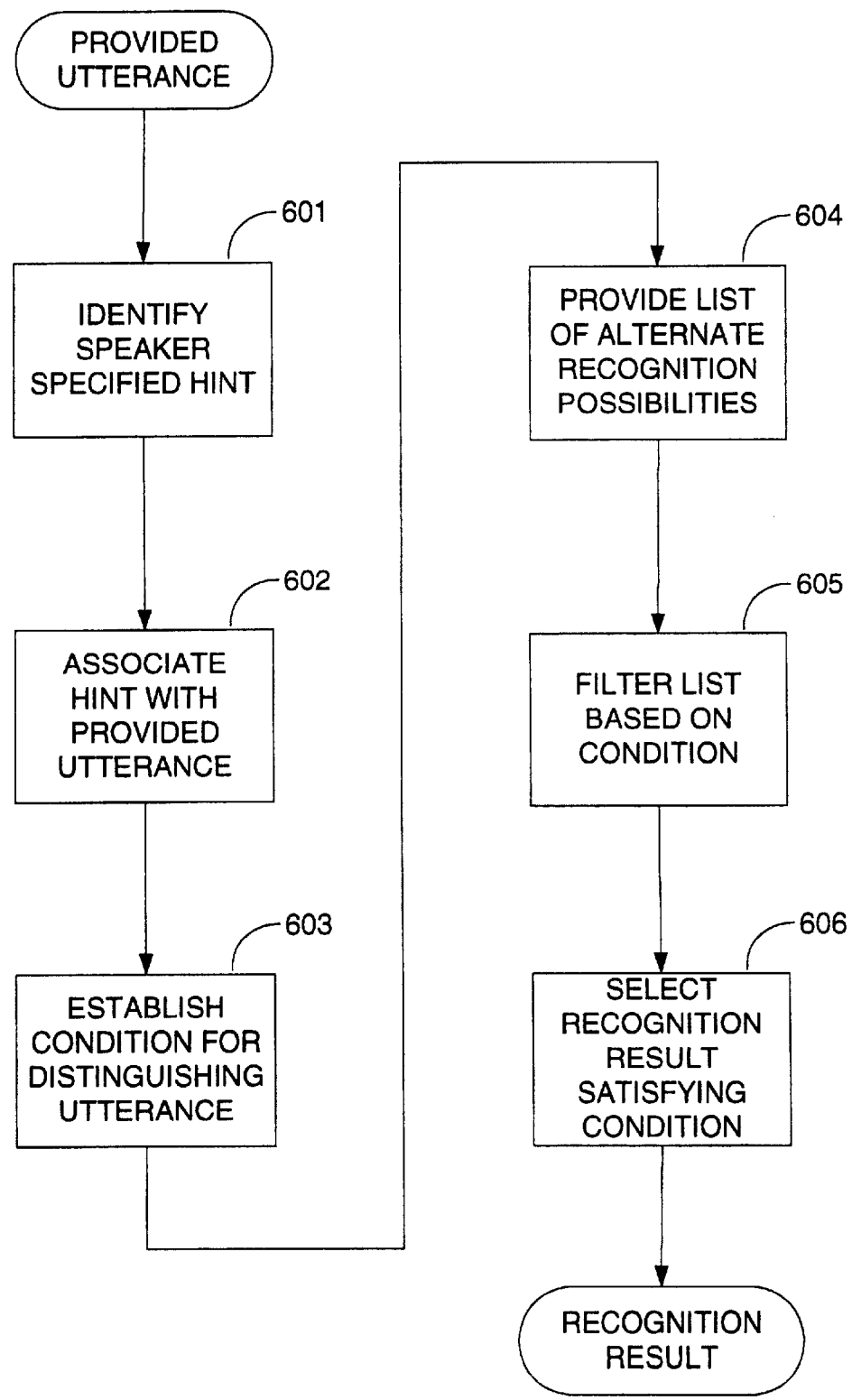
FIG. 6 is a logical flowchart of a method in accordance with a preferred embodiment of the invention.

In communication with the speech recognition engine 501 is a hint recognizer 502 which identifies a speaker-specified hint received by the speech recognition engine 501, step 601 in FIG. 6. Such a hint is essentially a command to the speech recognition engine 501 rather than dictated text. Distinguishing spoken commands from dictated text is as described above, and utilized in the VoiceXpress™ product which distinguishes continuously spoken natural language commands from continuously dictated text.

In step 602 of FIG. 6, the hint is associated with a previously provided input utterance. Based upon the hint, a condition specifier 504 which is coupled to hint recognizer 502 (shown in FIG. 1) establishes a condition for distinguishing the provided utterance, step 603 of FIG. 6. In step 604, a list may be provided of alternative recognition possibilities for the provided utterance. Typically, a dictionary 503 (FIG. 1) with linked entries will be available to the speech recognition engine 501 to provide such alternative recognition possibilities. In step 605, the list of alternative recognition possibilities is then filtered based on the condition established from the hint. Lastly, the result selector 505, which is coupled to the condition specifier 504 (FIG. 1), will select the recognition result which satisfies the condition in step 606.

In a preferred embodiment, system commands may be provided such as "spelled with X", "spelled with an X", "with an X", "with X", "without X", or the equivalent. In such a dictation system, X may be one or more letters of the alphabet in the language of the system, e.g., "d", "t", "double-l", "dt" (typical for Dutch). Alternatively, X may be a description or hint of a KANJI character, for example, related to the number of strokes of the character, or some other feature used to distinguish between KANJI characters. Other orthographic hints are also within the scope of a preferred embodiment. For example, a hint may include a designation of the alphabet in which the utterance is rendered, e.g., in Japanese, hiragara or katakana.

As an alternative, or in addition, system commands may supply a hint about a morphological property, e.g., singular, plural, or past tense. Furthermore, a hint may be some other linguistic property characterizing the provided utterance— for example, a semantic property such as "the color" when uttered after "red". Such a hint also may refer to the context of previously dictated text to characterize a word, e.g., "as I used it before". These hints can be given by the user without disrupting the flow of the dictation.

When a "Y spelled with X" command is recognized, the system looks up Y and considers various alternatives— homophones or alternative recognition results. These alternatives can be retrieved from a dictionary which contains links between all words that sound alike (sometimes referred to below and in the claims as a "linked dictionary"), or, from an alternatives list in the recognition result of the word Y. The alternatives are then filtered based on whether they fulfill the command criterion "X" (or not, in a case of "without X"). From the remaining alternatives, one is chosen, e.g.,the alternative with the highest occurrence probability.

The alternative filtering may be achieved in various manners. In one approach, all alternatives which lack the characters described in X are removed. Some pre-processing may be done, for example, "double L" would be replaced by "LL", then all alternatives not containing "LL" are removed. Another filtering approach exploits the fact that many hints are related to verb endings ("sent with a t"). Accordingly, the system may check whether the last letter(s) of the verb correspond to X. In this manner, X can be restrained to commonly confusable verb endings (e.g., d, t for English; e, s, es, t, ent for French). In another filtering approach, identifiers in a dictionary may be utilized to show to which letter a hint applies, if present (an index to a start position in the word string would suffice). For example, to differentiate KANJI characters, the hint may be stored in the dictionary entry for a word, such as in a field indicating the number of strokes in the character.

As an alternative to generating a list of alternatives and then filtering for the condition established by the hint, it is within the scope of the present invention to use the condition in connection with a linked dictionary to produce directly a single recognition result satisfying the condition.

A preferred embodiment also has language model and grammar implications. In speech recognition, a word or a command can only be recognized if it is part of a grammar of a language model. This also applies to the hints as used in a preferred embodiment. Different options are possible to add hints to a language model. For example, the hint phrase "spelled with" may be modeled in the same way as a "capitalize that" command. That is, the hint can occur at any point in the dictation, after any word. This can be modeled by giving the hint a unigram occurrence probability. The value of the probability should be in line with the probability assigned to other commands such as "capitalize that". Alternatively, "spelled with" may be constrained to occurring only after certain classes of confusable words; for example, only after verbs.

In a hint such as "Y spelled with X", the X can also be modeled in different ways. For example, X may be part of the language model and treated in the same way as any other word, e.g.,as a unigram, or bigram. Thus, a probability can be computed for the transitions "with X", "with a X", and "with an X" in the same way as with other recognition probabilities. Alternatively, X may be treated as a limited domain spelling grammar, which is entered when the system recognizes the phrase "spelled with". The grammar would incorporate all commonly given hints. Similarly, the recognition system may switch modes to a spelling grammar to recognize X. Or, the phrase "spelled with X" may be treated as a separate grammar. This grammar may be entered through normal dictation, or it may be activated when displaying an alternative list as a separate window.

Although preferred embodiments have been described above with respect to the use of a single hint, it is within the scope of the present invention to provide a plurality of hints. In French, for example, one might usefully indicate that a verb is feminine and singular, thereby providing two hints. Although the present invention is particularly applicable to continuous dictation systems, it is also applicable to discrete dictation systems. Furthermore, while the invention may be employed for hint-giving during dictation, it may also be applied as a correction mechanism for text that has already been dictated. For example, hints may be used to select a recognition result from a displayed list of alternative recognition possibilities appearing in a window separate from the text. In this way a "Y spelled with X" command is not embedded in normal dictation mode, but provides a novel way to select alternatives in an alternatives list. Alternatively, when in the correction mode, a hint may cause the immediate selection of a recognition result, without the display of an alternatives list, in the manner described above for dictation. In such an embodiment, a hint need not necessarily be identified as such, since the system is already in a correction mode and may be configured to act on the hint directly without needing an identification step or a hint recognizer.

What is claimed is:

1. A method of utilizing a speech recognizer to distinguish a provided utterance from one or more similar-sounding utterances when a speaker-specified hint as to the spelling of the provided utterance is provided, the hint being different from a full or partial spelling starting from the beginning of the provided utterance, the method comprising:
   (a) identifying the hint and associating with it the provided utterance;
   (b) using the hint to establish a condition for distinguishing the provided utterance from the one or more similar sounding utterances; and
   (c) selecting a recognition result, derived in conjunction with operation of the speech recognizer, that satisfies the condition.

2. A method according to claim 1, wherein the step of selecting a recognition result, derived in conjunction with the operation of the speech recognizer, that satisfies the condition includes:
   (a) providing a list of alternative recognition possibilities and
   (b) filtering the list based upon the condition.

3. A method according to claim 2, wherein the step of providing a list of alternative recognition possibilities includes using the speech recognizer to provide entries in the list.

4. A method according to claim 2, wherein the step of providing a list of alternative recognition possibilities includes utilizing a linked dictionary to provide entries in the list.

5. A method according to claim 2, wherein the step of providing a list of alternative recognition possibilities includes both using the speech recognizer and utilizing a linked dictionary to provide entries in the list.

6. A method according to claim 1, wherein the hint includes reference to the context of previous dictation to characterize the provided utterance.

7. A method according to claim 1, wherein the hint is a linguistic property characterizing the provided utterance.

8. A method according to claim 7, wherein the hint is an orthographic property characterizing the provided utterance.

9. A method according to claim 7, wherein the hint is a morphological property characterizing the provided utterance.

10. A method according to claim 7, wherein the hint is a semantic property characterizing the provided utterance.

11. A method according to claim 1, wherein the hint is a fractional spelling of the provided utterance.

12. A method according to claim 1, wherein the hint is a grammatical term characterizing the provided utterance.

13. A method of utilizing a speech recognizer to distinguish a provided utterance from one or more similar-sounding utterances when a plurality of speaker-specified hints as to the spelling of the provided utterance is provided, the hint being different from a full or partial spelling starting from the beginning of the provided utterance, the method comprising:
   (a) identifying the hints and associating with them the provided utterance;
   (b) using the hints to establish conditions for distinguishing the provided utterance from the one or more similar-sounding utterances; and
   (c) selecting a recognition result, derived in conjunction with the operation of the speech recognizer, that satisfies the conditions.

14. A speech recognition system for distinguishing a provided utterance from one or more similar-sounding utterances when a speaker-identified hint as to the spelling of the provided utterance is provided, the hint being different from a full or partial spelling starting from the beginning of the provided utterance, the system comprising:
   (a) a hint recognizer which identifies the hint and associates with it the provided utterance;
   (b) a condition specifier, coupled to the hint recognizer, which uses the hint to establish a condition for distinguishing the provided utterance from the one or more similar-sounding utterances; and
   (c) a result selector, coupled to the condition specifier, which selects a recognition result that satisfies the condition.

15. A system according to claim 14, wherein the system further comprises a dictionary, to which the result selector is coupled, to provide entries in the list of alternative recognition possibilities.

16. A system according to claim 15, wherein the improvement further comprises a dictionary, to which the result selector is coupled, to provide entries in the list of alternative recognition possibilities.

17. A system according to claim 14, wherein the hint includes reference to the context of previous dictation to characterize the provided utterance.

18. A system according to claim 14, wherein the hint is a linguistic property characterizing the provided utterance.

19. A system according to claim 18, wherein the hint is an orthographic property characterizing the provided utterance.

20. A system according to claim 18, wherein the hint is a morphological property characterizing the provided utterance.

21. A system according to claim 18, wherein the hint is a semantic property characterizing the provided utterance.

22. A system according to claim 14, wherein the hint is a fractional spelling of the provided utterance.

23. A system according to claim 14, wherein the hint is a grammatical term characterizing the provided utterance.

24. A speech recognition system for distinguishing a provided utterance from one or more similar-sounding utterances when a plurality of speaker-specified hints as to the spelling of the provided utterance is provided, the hint being different from a full or partial spelling starting from the beginning of the provided utterance, the system comprising:
- (a) a hint recognizer for identifying the hints and associating with them the provided utterance;
- (b) a condition specifier, coupled to the hint recognizer, for using the hints to establish a condition for distinguishing the provided utterance from the one or more similar-sounding utterances; and
- (c) a result selector, coupled to the condition specifier, for selecting a recognition result that satisfies the conditions.

25. A speech recognition system that is capable of distinguishing a provided utterance from one or more similar-sounding utterances when a speaker-specified hint as to the spelling of the provided utterance is provided, the hint being different from a full or partial spelling starting from the beginning of the provided utterance, the system comprising:
- (a) means for identifying the hint and associating with it the provided utterance;
- (b) means for using the hint to establish a condition for distinguishing the provided utterance from the one or more similar-sounding utterances; and
- (c) means for selecting a recognition result, derived in conjunction with operation of the speech recognizer, that satisfies the condition.

\* \* \* \* \*